United States Patent [19]
Grube et al.

[11] Patent Number: 5,517,568
[45] Date of Patent: May 14, 1996

[54] METHOD OF DETECTING UNAUTHORIZED USE OF A WIRELESS COMMUNICATION CHANNEL

[75] Inventors: Gary W. Grube, Palatine; Timothy W. Markison, Hoffman Estates; Susan L. Lukasik, Lombard, all of Ill.

[73] Assignee: Motorola, Inc., Schaumburg, Ill.

[21] Appl. No.: 231,563

[22] Filed: Apr. 21, 1994

[51] Int. Cl.$^6$ .................... H04L 9/00; H04L 9/32
[52] U.S. Cl. .................... 380/23; 380/2; 380/25; 380/49
[58] Field of Search .................... 307/202.1; 380/4, 380/23, 25, 49, 50, 1, 2; 327/525

[56] References Cited

U.S. PATENT DOCUMENTS

| | | | |
|---|---|---|---|
| 4,218,738 | 8/1980 | Matyas et al. | 380/25 |
| 4,672,572 | 6/1987 | Alsberg | 380/23 |
| 4,679,236 | 7/1987 | Davies | 380/23 |
| 4,799,258 | 1/1989 | Davies | 380/23 X |
| 4,926,475 | 5/1990 | Spiotta et al. | 380/2 |
| 4,956,769 | 9/1990 | Smith | 380/25 X |
| 5,014,234 | 5/1991 | Edwards, Jr. | 380/4 X |
| 5,018,096 | 5/1991 | Aoyama | 380/25 X |
| 5,048,085 | 9/1991 | Abraham et al. | 380/23 |

OTHER PUBLICATIONS

R. F. Graf, *Dictionary of Electronics;* (Howard W. Sams & Co.; Indianapolis; 1974; p. 126).

*Primary Examiner*—Bernarr E. Gregory
*Attorney, Agent, or Firm*—Susan L. Lukasik

[57] ABSTRACT

A method for detecting unauthorized use of a communication unit (102) in a secure wireless communication system includes monitoring (201) a wireless communication channel (103) presently supporting a secure communication. It is determined (202) whether the secure communication is encrypted with active system encryption parameters. When the secure communication is not encrypted with the active system encryption parameters, a communication unit (102) involved in the secure communication is indicated (203) as a potential unauthorized communication unit (102). The steps of monitoring, determining, and indicating are performed by a communication unit (102) or a central controller (101).

26 Claims, 3 Drawing Sheets

METHOD OF DETECTING UNAUTHORIZED USE OF A WIRELESS COMMUNICATION CHANNEL

FIELD OF THE INVENTION

This invention relates to secure wireless communication systems, including but not limited to detecting unauthorized use of a wireless communication channel within a secure wireless communication system.

BACKGROUND OF THE INVENTION

Communication systems are known to include a central controller, a plurality of communication units, and communication resources. In such systems, the communication resources may be frequencies, pairs of frequencies, TDM slots, or any medium that carries RF (radio frequency) transmissions.

Encrypted, also known as secure, voice and data communication systems are well known. Many of these systems provide secure communications between two or more users by sharing one or more pieces of information between the users, which permits only those users knowing that information to properly decrypt a message. This information includes an encryption key, an encryption algorithm, and in some cases, various initiating information. A message is typically encrypted using a particular encryption algorithm, or technique, using an encryption key that adds extra security into secure transmissions. Examples of encryption algorithms include data encryption standard (DES), digital voice protection (DVP), cipher feedback, and open loop feedback. These encryption algorithms are generally used throughout the secure technology arena.

In secure communication systems, a communication unit has the option of utilizing the security of encrypted transmissions, or transmitting in an unencrypted, or clear, mode. Thus, the central controller, or communication resource allocator, must be equipped to process both clear communication requests and encrypted communication requests. Most communications occur in an encrypted format in secure communication systems. The security of the secure communication system comes from the encryption of communications between two or more communication units. In order for a communication unit to decode such messages, that unit must have both the correct encryption algorithm and the correct encryption key. If either the encryption key or the encryption algorithm are incorrect, a communication cannot be decoded properly.

Because of security issues related with secure communication systems, encryption keys and/or encryption algorithms may be changed within the secure wireless communication system. To maintain security over a longer period of time, secure communication systems regularly change the active system encryption parameters, which include encryption algorithm and encryption key. Such a change may be monthly, daily, or even hourly depending on the nature of security desired. Active system encryption parameters may also be changed as desired, particularly if a communication unit is lost or stolen, thus limiting the time of access an unauthorized user may obtain. When a unit does not have a correct encryption key and encryption algorithm, that unit will not be able to decode any information from a communication that is encrypted using the active system encryption parameters. The unit may, however, continue to communicate in an unencrypted manner.

Because the secure communication system can handle both unencrypted and encrypted communications, it is possible for an unauthorized communication unit to operate on the secure communication system in a clear mode and go undetected. When unauthorized communication units are accessing a communication system, whether a secure or a non-secure system, the efficiency of such systems decreases. Thus, authorized users suffer in slower throughput of their communication requests as a result of unauthorized use of the system.

Present technologies do little to detect unauthorized use of a secure communication system, while a substantial amount of technological effort is placed into ensuring that secure communications remain secure. Therefore, a need exists for a method of detecting unauthorized use of a secure communication system.

DESCRIPTION OF A PREFERRED EMBODIMENT

Figure 1:
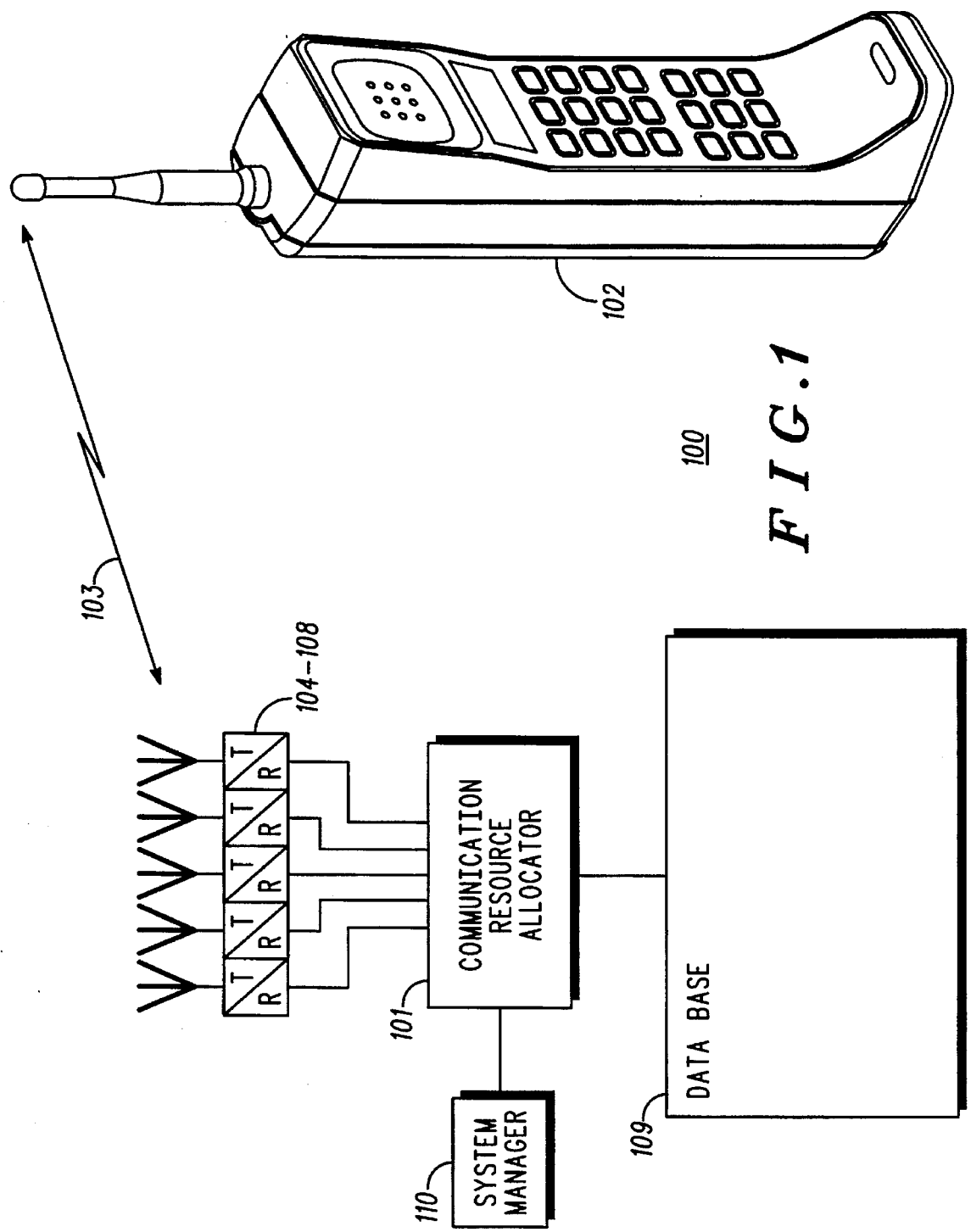
FIG. 1 is a block diagram of a communication system in accordance with the invention.

The following describes an apparatus for and method of detecting unauthorized use of a wireless communication channel. Encrypted communications are monitored on RF communication channels. If an encrypted communication is found that is not using active encryption parameters, the communication units involved in the communication are considered potential unauthorized units. If the encrypted communication is found to be encrypted with previously used or inactive encryption parameters, the communication units involved in the communication are considered unauthorized units.

A method for detecting unauthorized use of a communication unit in a secure wireless communication system includes monitoring a wireless communication channel presently supporting a secure communication. It is determined whether the secure communication is encrypted with active system encryption parameters. When the secure communication is not encrypted with the active system encryption parameters, a communication unit involved in the secure communication is indicated as a potential unauthorized communication unit. The steps of monitoring, determining, and indicating are performed by a communication unit or a central controller.

An additional feature of the present invention includes sending an indication of the potential unauthorized communication unit to a system manager. The system manager determines if system encryption parameters used by the potential unauthorized communication unit match previously used system encryption parameters. The active system encryption parameters include at least one encryption key and/or at least one encryption algorithm. A determination may be made to see if an encryption key used by the potential unauthorized communication unit matches an active encryption key in the secure wireless communication system. A determination may be made to see if an encryption algorithm used by the potential unauthorized communication unit matches an active encryption algorithm in the secure wireless communication system. An additional feature includes sending, to the potential unauthorized communication unit, a message encoded with the active system parameters to check if the potential unauthorized communication unit is able to decode the message properly. In addition, at least one new active system encryption parameter may be sent to authorized communication units in the secure wireless communication system.

An alternative method for detecting unauthorized use of a communication unit in a secure wireless communication system includes monitoring a wireless communication channel currently supporting a secure communication. When it is determined that the secure communication is encrypted with an inactive system encryption parameter, a communication unit involved in the secure communication is indicated as a potential unauthorized communication unit. In the alternative method, the steps of monitoring, determining, and indicating are performed by a communication unit or a central controller.

An additional feature of the alternative method includes sending an indication of the potential unauthorized communication unit to a system manager. The system manager determines if system encryption parameters used by the potential unauthorized communication unit match previously used system encryption parameters. The inactive system encryption parameters include at least one encryption key and/or at least one encryption algorithm. A determination may be made to see if an encryption key used by the potential unauthorized communication unit matches an inactive encryption key in the secure wireless communication system. A determination may be made to see if an encryption algorithm used by the potential unauthorized communication unit matches an inactive encryption algorithm in the secure wireless communication system. An additional feature includes sending, to the potential unauthorized communication unit, a message encoded with the active system parameters to check if the potential unauthorized communication unit can decode the message properly. In addition, at least one new active system encryption parameter may be sent to authorized communication units in the secure wireless communication system.

A secure communication monitor comprises a wireless receiver that monitors a wireless communication channel currently supporting a secure communication. The secure communication monitor also comprises a database containing an active system encryption parameters and previously used system encryption parameters. A processing unit, operably coupled to the wireless receiver and the database, determines whether the secure communication unit is utilizing the active system encryption parameters. The processing unit determines which previously used system encryption parameters are used by the secure communication unit. The processing unit generates in indication that the secure communication unit is using previously used system encryption parameters and is a potential unauthorized communication unit. The secure communication monitor may be coupled to a system manager.

FIG. 1 illustrates a secure communication system 100 that includes a communication resource allocator 101 (or central controller), a plurality of communication units 102, a plurality of communication resources 103, repeaters 104–108, a database 109, and a system manager 110. In such a system, one of the repeaters 104–108 is designated as a control channel, while the remaining channels are designated as working channels. In operation, a communication unit 102 transmits a service request via a communication resource of the control channel to the central controller 101. Upon receiving the service request, the central controller 101 determines whether the communication unit is authorized to access the system and whether the communication unit has requested a service to which it has subscribed. If both of the previous inquiries are answered affirmatively, the central controller 101 processes the request.

In the secure communication system 100, the communication unit 102 may transmit in its service request in an encrypted mode or in an unencrypted, or clear, mode. When transmitting in the encrypted mode, the communication unit 102 and the central controller 101 must utilize the same encryption algorithm and utilize the same encryption key for correct decryption of communication messages. Establishment of the encryption algorithm and the encryption key is not the scope of this invention and is generally understood in the art, thus no further discussion will be presented regarding these items unless to further enhance the understanding of the present invention. The communication unit 102 may be a Motorola SABER radio, STX radio, SPECTRA radio, or any other type of radio that transmits in a secure (encrypted) and unsecure (unencrypted) mode. The central controller may be a Motorola Zone Controller, while the system manager may be a Motorola Smartzone Manager and the repeaters 104–108 may be Quantar repeaters.

Figure 2:
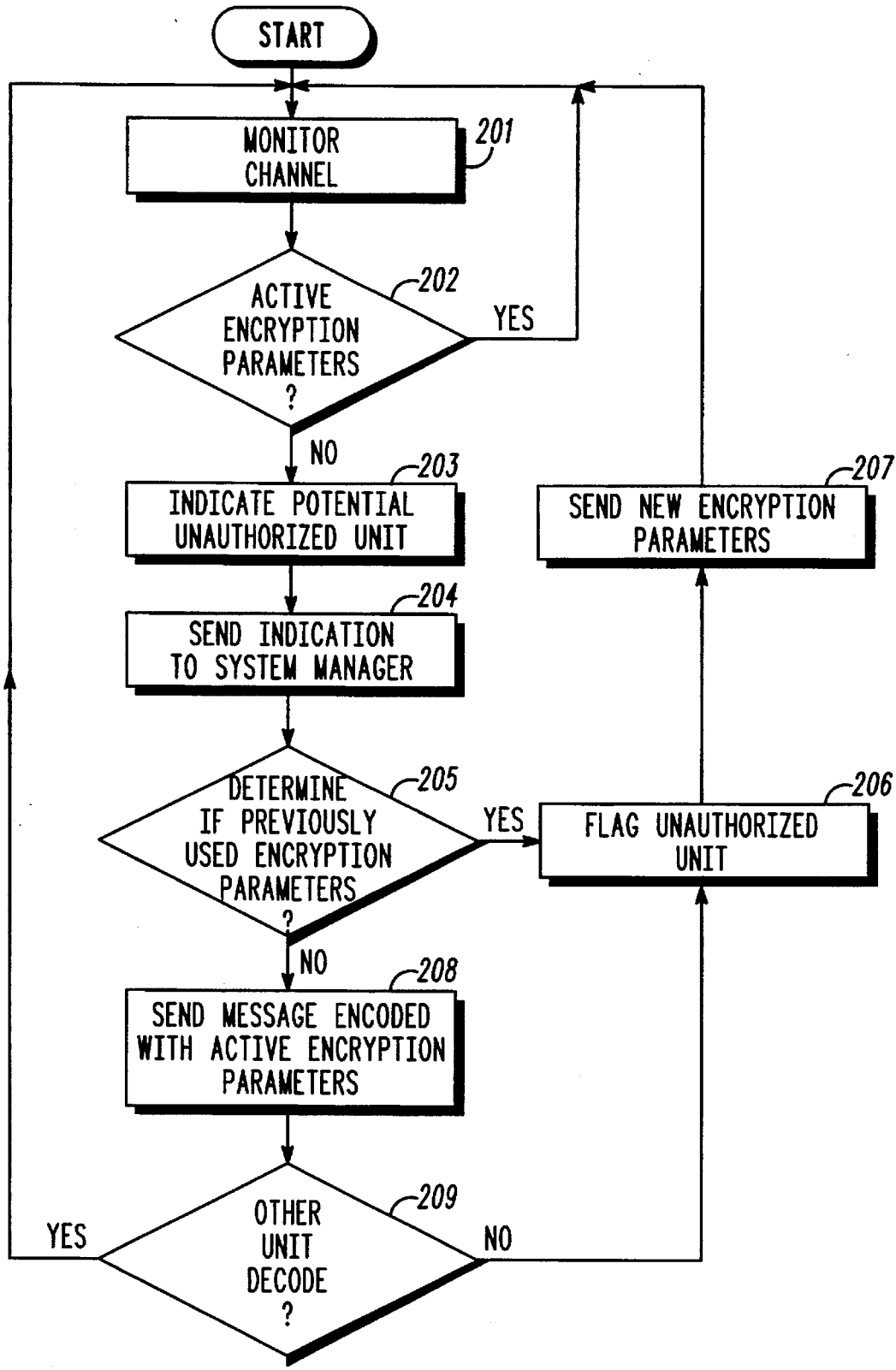
FIG. 2 is a flow chart showing detection of unauthorized use of a communication unit in a secure wireless communication system in accordance with the invention.

A flow chart showing detection of unauthorized use of a communication unit 102 in a secure wireless communication system is shown in FIG. 2. At step 201, a wireless communication channel within the secure wireless communication system, is monitored when that channel is presently supporting a secure communication. At step 202, a determination is made as to whether the secure communication is encrypted with active system encryption parameters. This determination is made by attempting to decrypt the message using active system encryption parameters, and if the communication is properly decrypted by any active system encryption parameters, the message is considered to have been encrypted by active system encryption parameters. If the secure communication is encrypted with active system encryption parameters, the process continues with step 201. If at step 202, the secure communication is not encrypted with active system encryption parameters, the process continues with step 203, where an indication is made that a communication unit 102 involved in the secure communication is a potential unauthorized communication unit 102. At step 204, that indication of a potential unauthorized communication unit 102 is sent to a system manager.

If at step 205, the secure communication was encrypted by previously used system encryption parameters, the process continues with step 206. This determination is made by attempting to decrypt the message using previously used or inactive system encryption parameters, and if the communication is properly decrypted by any of these parameters, the message is considered to have been encrypted by previously used or inactive system encryption parameters. At step 206, the unit engaged in the secure communication is flagged as an unauthorized unit, as no authorized unit would be using previous encryption parameters. At step 207, new encryption parameters are set to authorized communication units 102 in the secure wireless communication system, as a further measure to increase security. Step 207 is not necessary for successful operation of the present invention, but is used in the preferred embodiment.

If, at step 205, it is determined that the secure communication is not encrypted by previously used system encryption parameters, the message has not been encrypted by any system encryption parameters known to the communication system, the communication units engaged in the communication are then assumed to be unauthorized, and the process continues with step 208. A message is sent to the unit engaged in the secure communication at step 208. The message is encoded with the active system encryption parameters. At step 209, it is determined if the other unit can decode this message encrypted with the active system encryption parameters. If at step 209, the unit can decrypt message, and so proves that decryption, the procedure continues with step 201. Such a determination may be made by simply requesting an acknowledgment of the encrypted message back from the questionable unit, and requests an encrypted message back wherein that message must be encrypted with active system encryption parameters. If no return message is received from the unit, it is assumed that the questionable unit was unable to comply with the directions of the message, either because it could not decrypt the incoming message or encrypt an outgoing message. The encoded message from step 208 is sent to the questionable unit without notification of, nor need for response by, the user of the questionable unit. Any acknowledgment is automatically returned, likewise without notification of or need for response by the user. If at step 209 the other unit is not able to decode and/or respond to the message sent in step 208, the process continues with step 206 where that unit is flagged as an unauthorized unit.

The method of FIG. 2 may be performed by another communication unit 102, such as a portable radio or mobile radio. The steps of the flow chart of FIG. 2 may also be performed by a central controller. Further, when determining if an active system encryption parameter is being used, the encryption key and/or the encryption algorithm may be checked to see if they match an active encryption key or any inactive encryption key, i.e., previously used. In the preferred embodiment, digital encryption is used to encode communications.

Figure 3:
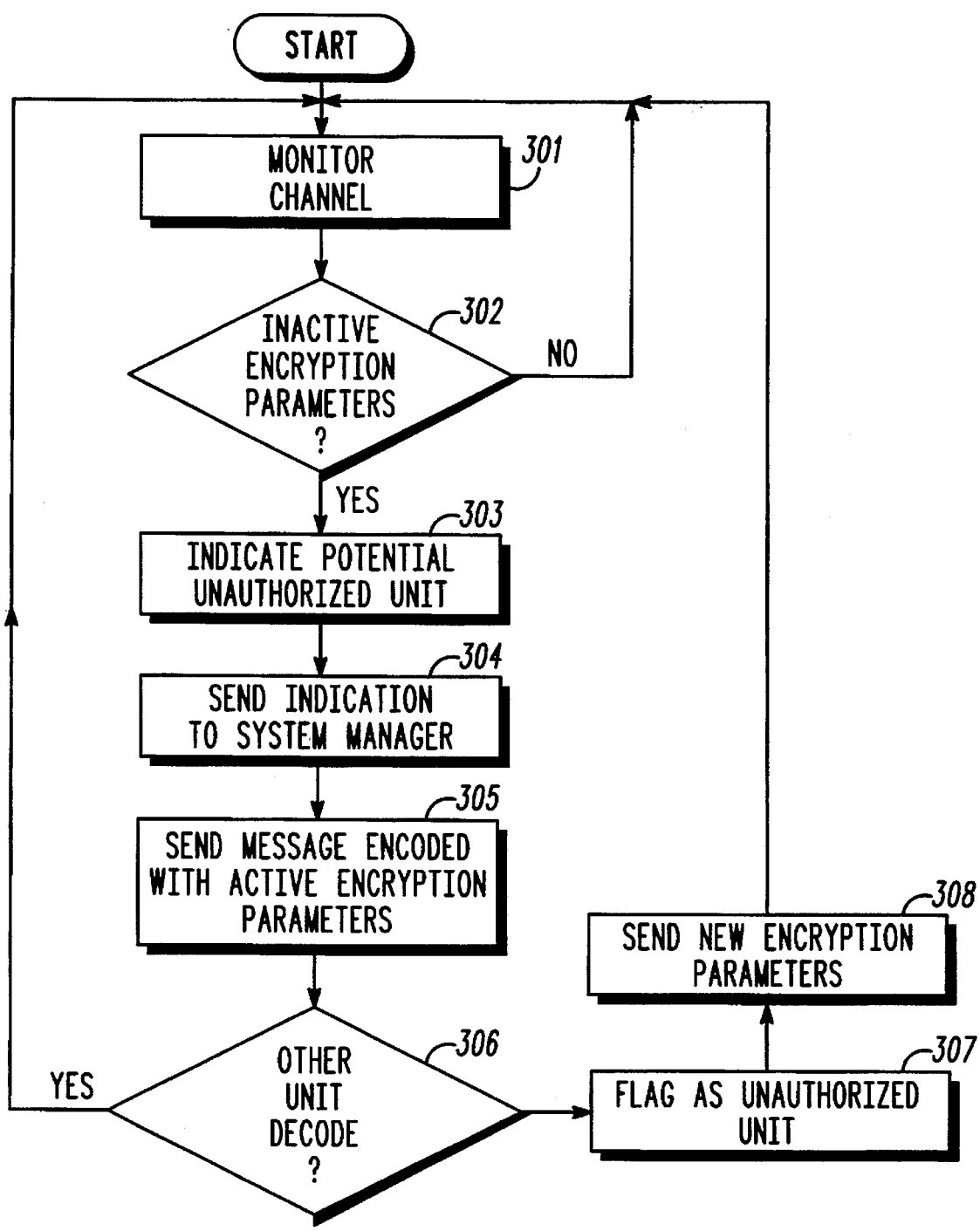
FIG. 3 is a flow chart showing flow chart showing an alternative method for detecting unauthorized use of a communication unit in a secure wireless communication system in accordance with the invention.

A flow chart showing an alternative method for detecting unauthorized use of a communication unit 102 is shown in FIG. 3. At step 301, a wireless communication channel currently supporting a secure communication is monitored. At step 302, it is determined whether the secure communication is encrypted with an inactive system encryption parameter. An inactive system encryption parameter is a system encryption parameter that was previously used within a system, but has since been replaced by a more current active system encryption parameter. If an inactive encryption parameter is not found in the secure communication in step 302, the process continues with step 301. If at step 302, however, an inactive system encryption parameter is found, the process continues with step 303. At step 303, an indication is made that any communication unit 102 involved in the secure communication is a potential unauthorized communication unit 102. At step 304, that indication is sent to a system manager in the preferred embodiment. In step 305, a message is sent to one or more of the potential unauthorized communication units 102. That message is encoded with active encryption parameters. If, at step 306, the unit targeted for the message in step 305 properly decodes the message at step 306, the process continues with 301. If however, the unit targeted for this message cannot decode the message at step 306, that unit is flagged as an unauthorized unit at step 307 and at step 308 new encryption parameters are sent to authorized communication units 102 within the secure wireless communication system as an added measure of security for the authorized users in the system. After step 308, the process continues with step 301.

The present invention provides a method for automatically detecting unauthorized use of a communication unit 102 in a secure wireless communication system. With such a method, communication units that have been modified to include unauthorized or duplicated identification codes can now be detected within a secure communication system. In addition, communication units that have been stolen from a police car, FBI car, etc., may be detected and disabled from accessing the communication system. Users that have developed their own encryption keys and subsequently obtain unauthorized use of secure communication resources will be detected because they do not have the correct active encryption parameters. Thus, the authorized users of the secure communication system will have enhanced system access and have greater security in utilizing the system, and also less contention for communication resources.

What is claimed is:

1. A method for detecting unauthorized use of a communication unit in a secure wireless communication system, comprising the steps of:
   a) monitoring a wireless communication channel presently supporting a secure communication;
   b) determining whether the secure communication is encrypted with active system encryption parameters; and
   c) when the secure communication is not encrypted with the active system encryption parameters, indicating that a communication unit involved in the secure communication is a potential unauthorized communication unit.

2. The method of claim 1, wherein the steps of monitoring, determining, and indicating are performed by a communication unit.

3. The method of claim 1, wherein the steps of monitoring, determining, and indicating are performed by a central controller.

4. The method of claim 1, wherein the step of indicating further comprises sending an indication of the potential unauthorized communication unit to a system manager.

5. The method of claim 4, wherein the system manager determines if system encryption parameters used by the potential unauthorized communication unit match previously used system encryption parameters.

6. The method of claim 1, wherein the active system encryption parameters include at least one encryption key.

7. The method of claim 1, wherein the active system encryption parameters include at least one encryption algorithm.

8. The method of claim 1, wherein the step of determining comprises the step of determining if an encryption key used by the potential unauthorized communication unit matches an active encryption key in the secure wireless communication system.

9. The method of claim 1, wherein the step of determining comprises the step of determining if an encryption algorithm used by the potential unauthorized communication unit matches an active encryption algorithm in the secure wireless communication system.

10. The method of claim 1, wherein the step of indicating further comprises the step of sending at least one new active system encryption parameter to authorized communication units in the secure wireless communication system.

11. A method for detecting unauthorized use of a communication unit in a secure wireless communication system, comprising the steps of:
   a) monitoring a wireless communication channel presently supporting a secure communication;

b) determining whether the secure communication is encrypted with active system encryption parameters;

c) when the secure communication is not encrypted with the active system encryption parameters, indicating that a communication unit involved in the secure communication is a potential unauthorized communication unit; and d) sending, to the potential unauthorized communication unit, a message encoded with the active system parameters to check if the potential unauthorized communication unit decodes the message properly.

12. A method for detecting unauthorized use of a communication unit in a secure wireless communication system, the method comprising the steps of:

a) monitoring a wireless communication channel currently supporting a secure communication;

b) determining whether the secure communication is encrypted with an inactive system encryption parameter; and c) indicating that a communication unit involved in the secure communication is a potential unauthorized communication unit.

13. The method of claim 12, wherein the steps of monitoring, determining, and indicating are performed by a communication unit.

14. The method of claim 12, wherein the steps of monitoring, determining, and indicating are performed by a central controller.

15. The method of claim 12, wherein the step of indicating further comprises sending an indication of the potential unauthorized communication unit to a system manager.

16. The method of claim 15, wherein the system manager determines if system encryption parameters used by the potential unauthorized communication unit match previously used system encryption parameters.

17. The method of claim 12, wherein the inactive system encryption parameters include at least one encryption key.

18. The method of claim 12, wherein the inactive system encryption parameters include at least one encryption algorithm.

19. The method of claim 12, wherein the step of determining comprises the step of determining if an encryption key used by the potential unauthorized communication unit matches an active encryption key in the secure wireless communication system.

20. The method of claim 12, wherein the step of determining comprises the step of determining if an encryption algorithm used by the potential unauthorized communication unit matches an active encryption algorithm in the secure wireless communication system.

21. The method of claim 12, wherein the step of indicating further comprises the step of sending at least one new active system encryption parameter to authorized communication units in the secure wireless communication system.

22. A method for detecting unauthorized use of a communication unit in a secure wireless communication system, the method comprising the steps of:

a) monitoring a wireless communication channel currently supporting a secure communication;

b) determining whether the secure communication is encrypted with an inactive system encryption parameter;

c) indicating that a communication unit involved in the secure communication is a potential unauthorized communication unit; and d) sending, to the potential unauthorized communication unit, a message encoded with active system parameters to check if the potential unauthorized communication unit decodes the message properly.

23. A secure communication monitor comprising:

a wireless receiver that monitors a wireless communication channel currently supporting a secure communication;

a database containing active system encryption parameters and previously used system encryption parameters; and a processing unit, operating together with the wireless receiver and the database, wherein the processing unit determines whether the secure communication unit is utilizing the active system encryption parameters.

24. The secure communication monitor of claim 23, wherein the processing unit determines which previously used system encryption parameters are used by the secure communication unit.

25. The secure communication monitor of claim 24, wherein the processing unit generates an indication that the secure communication unit is using previously used system encryption parameters and is a potential unauthorized communication unit.

26. The secure communication monitor of claim 24, wherein the secure communication monitor is coupled to a system manager.

\* \* \* \* \*